United States Patent
Takagi et al.

(10) Patent No.: US 9,774,036 B2
(45) Date of Patent: Sep. 26, 2017

(54) METHOD FOR PRODUCING POSITIVE ELECTRODE ACTIVE MATERIAL FOR NONAQUEOUS ELECTROLYTE SECONDARY BATTERIES, POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY USING SAME

(71) Applicant: SUMITOMO METAL MINING CO., LTD., Tokyo (JP)

(72) Inventors: Masanori Takagi, Ehime (JP); Haruki Kaneda, Ehime (JP); Hiroko Oshita, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 13 days.

(21) Appl. No.: 14/420,082

(22) PCT Filed: Aug. 13, 2013

(86) PCT No.: PCT/JP2013/071865
§ 371 (c)(1),
(2) Date: Feb. 6, 2015

(87) PCT Pub. No.: WO2014/034430
PCT Pub. Date: Mar. 6, 2014

(65) Prior Publication Data
US 2015/0194673 A1    Jul. 9, 2015

(30) Foreign Application Priority Data
Aug. 28, 2012 (JP) .................. 2012-187245

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/42* (2013.01); *H01M 4/366* (2013.01); *H01M 4/485* (2013.01);
(Continued)

(58) Field of Classification Search
CPC ...................................................... H01M 4/52
See application file for complete search history.

(56) References Cited

U.S. PATENT DOCUMENTS

| 6,468,693 B1 | 10/2002 | Takami et al. |
| 2007/0231694 A1 | 10/2007 | Abe et al. |

(Continued)

FOREIGN PATENT DOCUMENTS

| CN | 1698223 A | 11/2005 |
| JP | 2000-323143 A | 11/2000 |

(Continued)

OTHER PUBLICATIONS

International Search Report dated Nov. 5, 2013, issued in corresponding application No. PCT/JP2013/071865.

*Primary Examiner* — Barbara Gilliam
*Assistant Examiner* — Nathanael Zemui
(74) *Attorney, Agent, or Firm* — Westerman, Hattori, Daniels & Adrian, LLP (57) ABSTRACT

A method for manufacturing a positive active material for a nonaqueous electrolyte secondary battery having both thermal stability and charge-discharge capacity at a high level as well as excellent cycle characteristics. The method for manufacturing a positive active material for a nonaqueous electrolyte secondary battery includes: a step of adding a (Continued)

niobium salt solution and an acid simultaneously to a slurry of a nickel-containing hydroxide, and controlling the pH of the slurry at between 7 and 11 on a 25° C. basis to obtain a nickel-containing hydroxide coated with a niobium compound; a step of mixing the nickel-containing hydroxide coated with the niobium compound with a lithium compound to obtain a lithium mixture; and a step of firing the lithium mixture in an oxidizing atmosphere at 700° C. to 830° C. to obtain a lithium-transition metal composite oxide.

13 Claims, 2 Drawing Sheets

(51) Int. Cl.

| | | |
|---|---|---|
| *H01M 4/36* | (2006.01) | |
| *H01M 4/485* | (2010.01) | |
| *C01G 53/00* | (2006.01) | |
| *H01M 10/0585* | (2010.01) | |
| *H01M 4/02* | (2006.01) | |

(52) U.S. Cl.
CPC ......... *H01M 4/505* (2013.01); *C01P 2002/50* (2013.01); *C01P 2002/54* (2013.01); *C01P 2004/61* (2013.01); *C01P 2006/12* (2013.01); *H01M 10/0585* (2013.01); *H01M 2004/021* (2013.01); *H01M 2220/30* (2013.01)

(56) References Cited

U.S. PATENT DOCUMENTS

| | | | | |
|---|---|---|---|---|
| 2009/0104530 | A1* | 4/2009 | Shizuka | H01M 4/505 |
| | | | | 429/223 |
| 2011/0059363 | A1* | 3/2011 | Imanari | C01G 51/44 |
| | | | | 429/224 |
| 2012/0003542 | A1 | 1/2012 | Konishi et al. | |
| 2012/0119167 | A1* | 5/2012 | Matsumoto | C01G 53/42 |
| | | | | 252/519.15 |
| 2013/0052544 | A1* | 2/2013 | Ohkubo | H01M 4/5825 |
| | | | | 429/344 |
| 2013/0209890 | A1 | 8/2013 | Nagatomi | |

FOREIGN PATENT DOCUMENTS

| | | | | |
|---|---|---|---|---|
| JP | 2002-151071 A | | 5/2002 | |
| JP | 2005-142165 A | | 6/2005 | |
| JP | 2006-147500 A | | 6/2006 | |
| JP | 2006147500 A | * | 6/2006 | |
| JP | 2008-153017 A | | 7/2008 | |
| JP | 2008-181839 A | | 8/2008 | |
| JP | 2008181839 A | * | 8/2008 | |
| JP | 2012-14887 A | | 1/2012 | |
| KR | 10-2007-0098562 A | | 10/2007 | |
| WO | WO 2011016372 A1 | * | 2/2011 | ............. C01G 53/42 |
| WO | WO 2011108464 A1 | * | 9/2011 | ........... H01M 4/5825 |
| WO | 2012/043321 A1 | | 4/2012 | |

* cited by examiner

METHOD FOR PRODUCING POSITIVE ELECTRODE ACTIVE MATERIAL FOR NONAQUEOUS ELECTROLYTE SECONDARY BATTERIES, POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY USING SAME

TECHNICAL FIELD

The present invention relates to a method for manufacturing a positive active material for a nonaqueous electrolyte secondary battery, to a positive active material for a nonaqueous electrolyte secondary battery, and to a nonaqueous electrolyte secondary battery using the material.

BACKGROUND ART

In recent years, in conjunction with the spread of cell phones, notebook computers and other portable electronic devices, there has been strong demand for the development of small, light nonaqueous electrolyte secondary batteries with high energy densities. Such secondary batteries include lithium-ion secondary batteries. Lithium metal and lithium alloys, metal oxides, and carbon and the like are used as negative electrode materials in lithium-ion secondary batteries. These materials allow the extraction and insertion of lithium.

Such lithium-ion secondary batteries are currently a focus of active research and development. Of these, lithium-ion secondary batteries using lithium-transition metal composite oxides and especially the relatively easy to synthesize lithium-cobalt composite oxide ($LiCoO_2$) in the positive electrode material are promising and are being put into practical use as high-energy-density batteries because they provide high voltage in the 4V class. There has already been much development aimed at obtaining superior initial capacity characteristics and cycle characteristics with lithium-ion secondary batteries using this lithium-cobalt composite oxide ($LiCoO_2$), and considerable success has been achieved.

However, lithium-cobalt composite oxide ($LiCoO_2$) increases battery costs because it uses a rare and expensive cobalt compound as a raw material. Therefore, it would be preferable to use something other than lithium-cobalt composite oxide ($LiCoO_2$) as a positive active material.

Moreover, recently there has been increased interest in the use of lithium-ion secondary batteries not only as small secondary batteries for portable electronics, but also as large secondary batteries for power storage, electric vehicles and the like. It is hoped that it will be possible to expand the range of applications by lowering the costs of active materials so that lithium-ion secondary batteries can be manufactured more inexpensively, and examples of materials that have been newly proposed as positive active materials for lithium ion secondary batteries include lithium-manganese composite oxide ($LiMn_2O_4$) using manganese, which is less expensive than cobalt, and lithium-nickel composite oxide ($LiNiO_2$) using nickel.

In addition to using an inexpensive raw material, lithium-manganese composite oxide ($LiMn_2O_4$) is a promising substitute for lithium-cobalt composite oxide ($LiCoO_2$) because it is thermally stable and especially because it is highly safe with respect to ignition and the like, but the drawback is that because its theoretical capacity is only about half that of lithium cobalt composite oxide ($LiCoO_2$), it is unlikely to satisfy the ever-increasing demand for higher capacities in lithium-ion secondary batteries. Another problem is the extremely high rate of self-discharge at 45° C. and above, which lowers the charge-discharge life.

On the other hand, lithium-nickel composite oxide ($LiNiO_2$) has roughly the same theoretical capacity as lithium-cobalt composite oxide, and exhibits a slightly lower battery voltage than lithium-cobalt composite oxide. Thus, more efforts have been made to the development of the former oxide, because decomposition due to oxidation of the electrolyte solution is unlikely to be a problem, and higher capacities can be expected. However, when a lithium-ion secondary battery is prepared using lithium-nickel composite oxide composed simply of nickel as the positive active material without substituting another element for nickel, the cycle characteristics are inferior to those obtained with lithium-cobalt composite oxide. Another problem is that battery performance is more likely to deteriorate when the battery is used or stored in a high-temperature environment. Furthermore, when the battery is left in a high-temperature environment in a fully charged state, the battery releases oxygen at lower temperatures than a battery using a cobalt composite oxide.

To solve such problems, there has been research into adding niobium, an element with a higher valence than nickel, to lithium-nickel composite oxides. For example, with the aim of improving the thermal stability of a lithium-ion secondary battery during internal short-circuit, Patent Document 1 proposes a positive active material for a non-aqueous secondary battery, consisting of particles having a composition comprising at least two or more kinds of compounds composed of lithium, nickel, cobalt, element M, niobium and oxygen as shown by $Li_aNi_{1-x-y-z}Co_xM_yNb_zO_b$ (where M is one or more kinds of elements chosen from among the group of Mn, Fe, and Al, and $1.0 \leq a \leq 1.1$, $0.1 \leq x \leq 0.3$, $0 \leq y \leq 0.1$, $0.01 \leq z \leq 0.05$ and $2 \leq b \leq 2.2$ are established), wherein the particles are roughly spherical and have a roughly spherical shell containing at least one or more kinds of compounds with a niobium concentration higher than that of the aforementioned composition on the inside or near the surface of the particle, and wherein the active material exhibits an electric discharge capacity of α [mAh/g] when the positive electrode potential is in the range of 2 V to 1.5 V during initial discharge, and simultaneously satisfies the conditions for α and β of $80 \leq \alpha \leq 150$ and $0.15 \leq \beta \leq 0.20$ given β [deg] as the half-value width of face (003) of the layered crystal structure under X-ray diffraction.

Meanwhile, with the aim of improving thermal stability and increasing charge-discharge capacity, Patent Document 2 proposes a positive active material for a nonaqueous electrolyte secondary battery, represented by $Li_{1+z}Ni_{1-x-y}Co_xNb_yO_2$ ($0.10 \leq x \leq 0.21$, $0.01 \leq y \leq 0.08$, $-0.05 \leq z \leq 0.10$), wherein the standard deviation of the intensity ratio $I_{Nb}/I_{Ni}$ given $I_{Nb}$ as the peak intensity of the Nb L-rays and $I_{Ni}$ as the peak intensity of the Ni L-rays is within ½ the average value of the intensity ratio $I_{Nb}/I_{Ni}$ as measured by the energy dispersion method.

Moreover, with the aim of providing large capacity and improving thermal stability during charging, Patent Document 3 proposes a positive active material represented by the compositional formula $Li_xNi_aMn_bCo_cM1_dM2_eO_2$ (where M1 is at least one kind of element selected from the group consisting of Al, Ti and Mg, M2 is at least one kind of element selected from the group consisting of Mo, W and Nb, and $0.2 \leq x \leq 1.2$, $0.6 \leq a \leq 0.8$, $0.05 \leq b \leq 0.3$, $0.05 \leq c \leq 0.3$, $0.02 \leq d \leq 0.04$, $0.02 \leq e \leq 0.06$, and $a+b+c+d+e=1.0$ are established).

Meanwhile, with the aim of achieving both charge-discharge capacity and safety while controlling deterioration of the cycle characteristics, Patent Document 4 proposes a positive active material for a nonaqueous electrolyte secondary battery, having a structure comprising a lithium composite oxide represented by $Li_xNi_{(1-y-z-a)}Co_yMn_zM_aO_2$ (where M is at least one kind of element selected from the group consisting of Fe, V, Cr, Ti, Mg, Al, Ca, Nb and Zr, and $1.0 \leq x \leq 1.10$, $0.4 \leq y+z \leq 0.7$, $0.2 \leq z \leq 0.5$ and $0 \leq a \leq 0.02$ are established), coated on the surface with a material A (where A is a compound comprising at least one kind of element selected from the group consisting of Ti, Sn, Mg, Zr, Al, Nb and Zn).

To achieve a large charge-discharge capacity with excellent thermal stability, Patent Document 5 proposes a positive active material for a nonaqueous electrolyte secondary battery, represented by $Li_{1+z}Ni_{1-x-y}Co_xM_yO_2$ and having two kinds of M impregnated in or attached to the material (where $0.10 \leq x \leq 0.21$, $0.015 \leq y \leq 0.08$, and $-0.05 \leq z \leq 0.10$, with M comprising two or more kinds of elements selected from Al, Mn, Nb and Mo whose affinity with oxygen is higher than that of nickel, and having an average valence higher than trivalence).

The proposals of Patent Documents 1 to 5 above are all aimed at achieving both thermal stability and charge-discharge capacity, but when the added amount of niobium is small the charge-discharge capacity is large but the thermal stability is inadequate, while when the added amount of niobium is large the thermal stability is good but it is impossible to ensure adequate charge-discharge capacity. Another problem is the difficulty of ensuring superior cycle characteristics.

While demands have been growing over years for higher capacities in the small secondary batteries of cell phone devices and the like, the advantage of high capacity provided by lithium-nickel composite oxides is lost when capacity is sacrificed to ensure safety. There is also a strong push to use lithium-ion secondary batteries as large secondary batteries, and especially as power sources for hybrid vehicles and electric vehicles and as stationary storage batteries for power storage. It is important that these batteries also have long battery lives and excellent cycle characteristics. For these applications, it is important not only to resolve the safety problems of lithium-nickel composite oxides but also to achieve high capacity and long battery life while maintaining a high degree of safety.

CITATION LIST

Patent Literature

Patent Document 1: Japanese Patent Application Publication No. 2002-151071
Patent Document 2: Japanese Patent Application Publication No. 2006-147500
Patent Document 3: Japanese Patent Application Publication No. 2012-014887
Patent Document 4: Japanese Patent Application Publication No. 2008-153017
Patent Document 5: Japanese Patent Application Publication No. 2008-181839

SUMMARY OF INVENTION

Technical Problem

In light of these problems, it is an object of the present invention to provide a method for manufacturing a positive active material for a nonaqueous electrolyte secondary battery having excellent cycle characteristics as well as a high level of both thermal stability and charge-discharge capacity, along with a nonaqueous electrolyte secondary battery using this positive active material and having excellent safety, high capacity and excellent cycle characteristics.

It is another object of the present invention to provide a manufacturing method suited to industrial-scale production of this positive active material for a nonaqueous electrolyte secondary battery.

Solution to Problem

The inventors and others discovered, as a result of exhaustive research into the addition of niobium to lithium metal composite oxides for purposes of improving thermal stability, that by making a slurry of a nickel-containing hydroxide, adding a niobium salt solution and an acid simultaneously and controlling the pH of the slurry at a specific value, it was possible to coat a niobium compound on a nickel-containing hydroxide without detachment.

It was also discovered that a positive active material for a nonaqueous electrolyte secondary battery manufactured using this nickel-containing hydroxide coated with a niobium compound contains multiple microscopic voids, giving this positive active material excellent thermal stability and a high charge-discharge capacity, and the present invention was perfected based on this finding.

That is, the method for manufacturing a positive active material for a nonaqueous electrolyte secondary battery of the present invention is a method of manufacturing a nonaqueous electrolyte secondary battery positive active material formed of a lithium-transition metal composite oxide which is represented by a General Formula $Li_dNi_{1-a-b-c}Co_aM_bNb_cO_2$ (where M is at least one element selected from Mn, V, Mg, Ti and Al, and $0.05 \leq a \leq 0.35$, $0 \leq b \leq 0.10$, $0.006 \leq c \leq 0.06$, and $0.95 \leq d \leq 1.20$ are established) and which is composed of particles with a polycrystalline structure, this method including: a niobium coating step in which a niobium salt solution and an acid are added simultaneously to a slurry of a nickel-containing hydroxide, and pH of the slurry is controlled to between 7 and 11 on a 25° C. basis to thereby obtain a nickel-containing hydroxide coated with a niobium compound; a mixing step in which the nickel-containing hydroxide coated with the niobium compound is mixed with a lithium compound to obtain a lithium mixture; and a firing step in which the lithium mixture is fired at 700 to 830° C. in an oxidizing atmosphere to obtain the lithium-transition metal composite oxide.

Preferably the niobium coating step is preceded by a crystallization step in which the nickel-containing hydroxide is obtained by adding an alkaline aqueous solution to a mixed aqueous solution containing at least nickel and cobalt to crystallize the solution, and preferably the nickel-containing hydroxide is represented by a General Formula (1) $Ni_{1-a'-b'}Co_{a'}M_{b'}(OH)_2$ (where M is at least one element selected from Mn, V, Mg, Ti and Al, and $0.05 \leq a' \leq 0.35$, and $0 \leq b' \leq 0.10$ are established).

With respect to the c representing the niobium content of the lithium-transition metal composite oxide, preferably $0.006 \leq c \leq 0.05$.

In the niobium coating step, the pH of the slurry on a 25° C. basis is preferably 7 to 10.

Moreover, the mixing step is preceded by a heat treatment step in which the nickel-containing hydroxide coated with the niobium compound is heat treated at 105 to 800° C.

It is also desirable to include a water washing step in which the lithium-transition metal composite oxide obtained in the firing step is mixed with water in a proportion of 100 to 2000 g/L and washed.

The features of the positive active material for a nonaqueous electrolyte secondary battery of the present invention are that it is a positive active material for a nonaqueous electrolyte secondary battery consisting of a lithium-transition metal composite oxide represented by the General Formula $Li_dNi_{1-a-b-c}Co_aM_bNb_cO_2$ (where M is at least one element selected from Mn, V, Mg, Ti and Al, and $0.05 \leq a \leq 0.35$, $0 \leq b \leq 0.10$, $0.006 \leq c \leq 0.06$, and $0.95 \leq d \leq 1.20$ are established) and composed of particles with a polycrystalline structure, that it has a porous structure, and that its specific surface area is 2.0 to 7.0 $m^2/g$.

The crystallite diameter of the lithium-transition metal composite oxide is preferably 10 to 150 nm, and the c representing the niobium content of the lithium-transition metal composite oxide preferably fulfills $0.006 \leq c \leq 0.05$.

Moreover, a feature of the non-aqueous electrolyte secondary battery of the present invention is that it uses the aforementioned positive active material for a nonaqueous electrolyte secondary battery in the positive electrode.

Advantageous Effects of Invention

The method for manufacturing a positive active material for a nonaqueous electrolyte secondary battery of the present invention makes it possible to manufacture a positive active material with high thermal stability and charge-discharge capacity and excellent cycle characteristics, and by using this active material it is possible to obtain a nonaqueous electrolyte secondary battery having high stability and battery capacity and excellent cycle characteristics. Thus, a nonaqueous electrolyte secondary battery obtained by the present invention fulfills the requirements of increased capacity and long battery life necessary for the small secondary batteries of current cell phone devices and the like, while also being suitable for such large secondary battery applications as hybrid vehicles, electric vehicles and stationary storage batteries.

Moreover, the method for manufacturing a positive active material for a nonaqueous electrolyte secondary battery of the present invention has great industrial utility because it can be easily adapted to production on an industrial scale.

DESCRIPTION OF EMBODIMENTS

The present invention is a method for manufacturing a positive active material for a nonaqueous electrolyte secondary battery consisting of a lithium-transition metal composite oxide having a specific composition and structure, the method comprising: 1) a niobium coating step in which a niobium salt solution and an acid are added simultaneously to a slurry of a nickel-containing hydroxide so that the pH of the slurry is a specific value in the range of 7 to 11, to coat the nickel-containing hydroxide with the Nb compound and thereby obtain a nickel-containing hydroxide coated with a niobium compound; a mixing step in which the nickel-containing hydroxide coated with the niobium compound is mixed with a lithium compound to obtain a lithium mixture; and a firing step in which the lithium mixture is fired at 700° C. to 830° C. in an oxidizing atmosphere to obtain a lithium-transition metal composite oxide.

Preferably the niobium coating step is preceded by a crystallization step in which an alkaline aqueous solution is added to a mixed aqueous solution containing at least nickel and cobalt to crystallize the solution and obtain the nickel-containing hydroxide.

Each of the manufacturing steps and the resulting positive active material and nonaqueous electrolyte secondary battery and the like are explained in detail below.

1. Manufacturing Steps (1) Crystallization Step

The nickel-containing hydroxide used in the present invention is preferably a nickel-cobalt composite hydroxide represented by a General Formula $Ni_{1-a'-b'}Co_{a'}M_{b'}(OH)_2$ (where M is at least one element selected from Mn, V, Mg, Ti and Al, and $0.05 \leq a' \leq 0.35$, and $0 \leq b' \leq 0.10$ are established). This nickel-containing hydroxide preferably consists of secondary particles composed of primary particles.

The a' representing the cobalt content in the formula preferably fulfills $0.05 \leq a' \leq 0.35$, and more preferably fulfills $0.07 \leq a' \leq 0.20$. The b' representing the content of the additional element M preferably fulfills $0 \leq b' \leq 0.10$, and more preferably fulfills $0.01 \leq b' \leq 0.07$.

The method of manufacturing this nickel-containing hydroxide is not particularly limited, but preferably it is obtained by the following manufacturing method.

First, an alkaline solution is added to a mixed aqueous solution containing at least nickel (Ni) and cobalt (Co) in a reaction tank to obtain an aqueous reaction solution. Next, the aqueous reaction solution is agitated at a fixed rate and the pH is controlled to co-precipitate and crystallize the nickel-containing hydroxide in the reaction tank.

A sulfate salt solution, nitrate salt solution or chloride solution of nickel and cobalt may be used as the mixed aqueous solution here.

The composition of the metal elements contained in the mixed aqueous solution matches the composition of the metal elements contained in the resulting nickel-containing hydroxide. Thus, the composition of the metal elements in the mixed aqueous solution may be adjusted so as to be the same as the target composition of metal elements in the nickel-containing hydroxide.

A complexing agent may also be added to the mixed aqueous solution together with the alkaline solution.

The complexing agent is not particularly limited, and may be any capable of forming a complex by binding with the nickel ions and cobalt ions in the aqueous solution, such as an ammonium ion donor. The ammonium ion donor is not particularly limited, but ammonia, ammonium sulfate, ammonium chloride, ammonium carbonate, ammonium fluoride and the like may be used.

If no complexing agent is used the temperature of the aqueous reaction solution in the crystallization step is preferably in the range of more than 60° C. but no more than 80°

C., and the pH at the temperature of the aqueous reaction solution is preferably 10 to 11 (on a 25° C. basis).

If crystallization is performed with the pH of the reaction tank above 11, the nickel-containing hydroxide may occur as fine crystals, detracting from the filtration properties, and spherical crystals may not be obtained. On the other hand, if the pH is less than 10 the rate of production of the nickel-containing hydroxide may be greatly delayed, Ni may remain in the filtrate, and the amount of precipitated Ni may deviate from the target composition so that a mixed hydroxide of the target composition is not obtained.

If the temperature of the aqueous reaction solution is above 60° C., the solubility of the Ni is improved, so that the amount of precipitated nickel does not deviate from the target composition, and co-precipitation failure can be avoided. However, if the temperature of the aqueous reaction solution exceeds 80° C., the slurry concentration is increased because more water is evaporated, the solubility of the Ni is reduced, and sodium sulfate and other crystals may occur in the filtrate, increasing the impurity concentration and potentially detracting from the charge-discharge capacity of the positive electrode material.

On the other hand, when an ammonium ion donor such as ammonia is used as a complexing agent, because the solubility of the Ni is greater, the pH of the aqueous reaction solution is preferably 10 to 12.5, and the temperature is preferably 50° C. to 80° C.

The ammonia concentration of the aqueous reaction solution is preferably maintained at a specific value within the range of 3 to 25 g/L in the reaction tank. If the ammonia concentration is less than 3 g/L, because the solubility of the metal ions cannot be maintained at a constant level, plate-like primary hydroxide particles are not formed with a regular shape and size, and gel-like cores are likely to form, resulting in a broader particle size distribution. On the other hand, if the ammonia concentration exceeds 25 g/L the solubility of the metal ions is likely to be too high, increasing the amount of residual metal ions in the aqueous reaction solution and causing compositional deviations and the like.

The ammonia concentration is preferably maintained at a specific value because fluctuations in the ammonia concentration cause fluctuations in the solubility of the metal ions, so that uniform hydroxide particles are not formed. For example, the ammonia concentration is preferably maintained at a desired concentration with a range of about 5 g/L between the upper and lower limits.

Once a steady state has been reached, the precipitate is collected, filtered, and water washed to obtain the nickel-containing hydroxide. Alternatively, an aqueous solution containing the mixed aqueous solution, the alkali solution and an ammonium ion donor as necessary is supplied continuously, causing the reaction tank to overflow, and the precipitate is collected, filtered and water washed to obtain the nickel-containing hydroxide.

(2) Niobium Coating Step

In the niobium coating step, the nickel-containing hydroxide obtained in the crystallization step above is mixed with water, the resulting slurry is agitated as a niobium salt solution and an acid are dripped in simultaneously, and the pH of the slurry is controlled at a fixed pH within the range of 7 to 11 based on a liquid temperature of 25° C. to obtain a nickel-containing hydroxide coated with a niobium compound.

This nickel-containing hydroxide coated with the niobium compound is a precursor of a lithium-transition metal composite oxide (hereunder called simply a "precursor"). This precursor is preferably represented by a General Formula $Ni_{1-a-b-c}Co_aM_bNb_c(OH)_2$ (where M is at least one element selected from Mn, V, Mg, Ti and Al, $0.05 \leq a \leq 0.35$, $0 \leq b \leq 0.10$ and $0.006 \leq c \leq 0.06$ are established).

The c representing the niobium concentration of the precursor preferably fulfills $0.006 \leq c \leq 0.05$, and more preferably fulfills $0.006 \leq c \leq 0.04$. The a representing the cobalt content preferably more preferably fulfills $0.07 \leq a \leq 0.20$, while the b representing the content of the additional element M more preferably fulfills $0.01 \leq b \leq 0.07$.

The niobium salt solution is not particularly limited as long as it is a solution containing a niobium salt having a sufficiently high solubility in water, but it is desirable to use an aqueous solution of niobium metal or niobium hydroxide, niobium pentachloride, niobic acid or another niobium compound, which is dissolved in an aqueous potassium hydroxide solution. The niobium salt solution can also be obtained by dissolving ferroniobium in a potassium hydroxide solution, and removing the resulting iron compound.

Using a niobium salt produced by a compound that is poorly soluble or insoluble in water, the niobium will be segregated, making uniform coating more difficult.

The form of the niobium compound is not particularly limited and may be a powdered, particulate or aggregate form as long as it is commonly obtainable.

The preferred dissolution conditions of the niobium metal or niobium compound (hereunder called the "niobium source") will vary somewhat depending on the desired niobium concentration, but the niobium source is preferably dissolved in an aqueous potassium hydroxide solution with a potassium hydroxide concentration of 150 to 500 g/L and a temperature of 60° C. to 90° C.

If the potassium hydroxide concentration is less than 150 g/L, the niobium source does not dissolve sufficiently, and the amount of residual niobium in the residue increases. Conversely, a potassium hydroxide concentration above 500 g/L is close to the saturation concentration of potassium hydroxide, making it difficult to dissolve the niobium source. If the temperature during dissolution is less than 60° C., reactivity is reduced, and more time is required for dissolution. If the temperature is over 90° C., on the other hand, reactivity is increased but more water is evaporated, and there is a risk of a violent reaction and bumping.

The niobium concentration in the niobium salt solution is preferably 5 to 40 g/L. If the niobium concentration is less than 5 g/L, productivity is less because more niobium salt solution is required to achieve coating. If the niobium concentration is over 40 g/L, on the other hand, the niobium salt may precipitate in the solution, making it difficult to coat the niobium compound.

Next, a slurry obtained by mixing the nickel-containing hydroxide with water is agitated as the niobium salt solution and an acid are simultaneously dripped in so as to obtain a specific pH value and crystallize and coat a niobium compound and preferably niobium hydroxide on the nickel-containing hydroxide. The pH (25° C. basis) during this process is a specific value in the range of 7 to 11, or preferably 7 to 10, or more preferably at least 7 but less than 9. If the pH is less than 7, the metal component of the nickel-containing hydroxide dissolves, resulting in compositional deviations of the lithium-transition metal composite oxide that is the final product. If the pH exceeds 11, on the other hand, the deposited niobium compound detaches from the nickel-containing hydroxide, niobium leaks out during filtration, and it is not possible to obtain a specific niobium content (target niobium content) in the lithium-transition metal composite oxide. The composition may also not be uniform between particles of the nickel-containing hydroxide, detracting from the battery characteristics. The specific value at which the pH is controlled can be determined appropriately considering the added amount of niobium and the particle size of the nickel-containing hydroxide, and can be easily ascertained by preliminary testing or the like because a stable niobium coating is formed at the appropriate pH.

The acid is not particularly limited, sulfuric acid and hydrochloric acid are preferred because they are inexpensive and industrially available. The added acid concentration is preferably 10 to 50 mass % of the total acid aqueous solution.

It is important that the niobium salt solution and acid be dripped in simultaneously. This is because dripping the niobium salt solution and acid simultaneously causes the niobium compound coating progress to progress at the aforementioned pH range, and causes a suitable degree of damage to the nickel-containing hydroxide particles. That is, because the niobium compound crystallizes at a lower pH than the nickel hydroxide of the metal compounds contained in the nickel-containing hydroxide, the nickel-containing hydroxide particles are liable to be damaged. It is thought that in the subsequent firing step, these damaged areas turn into voids in the lithium-transition metal composite oxide particles, forming a porous structure that contributes to improving the charge-discharge capacity.

If the niobium salt solution and the nickel-containing hydroxide are mixed first and the acid is then dripped in to adjust the pH, on the other hand, the niobium compound is deposited before the nickel-containing hydroxide particles can be damaged, so that the nickel-containing hydroxide particles are not damaged sufficiently in the subsequent firing step to form a satisfactory porous structure.

The niobium compound is preferably deposited alone in the niobium coating step. That is, the most suitable pH for crystallization differs according to the type of metal, and is pH 9 to 10 in the case of aluminum hydroxide for example, so by crystallizing a niobium compound alone at a suitable pH, it is possible to achieve more efficient coating while controlling compositional deviation of the niobium in the lithium-transition metal composite oxide.

The equipment used in the niobium coating step is not particularly limited, and for example a reaction tank that allows agitation and temperature adjustment can be used. The pH is controlled at a specific value with a controller or the like, but the range of pH fluctuation during crystallization of the niobium compound is preferably controlled within a range of ±0.3 or less. It is thus possible to achieve a uniform niobium coating and a uniform state of the hydroxide particles.

After being coated with the niobium compound, the nickel-containing hydroxide is water washed to remove by-products produced during the coating process and obtain a precursor consisting of a niobium compound coated on the surface of a nickel-containing hydroxide. Because the coating of the niobium compound is finely and uniformly distributed on the surface of the nickel-containing hydroxide, diffusion inside the lithium-transition metal composite oxide particles occurs more easily in the subsequent firing step. As a result, niobium is distributed uniformly in the lithium-transition metal composite oxide after firing.

The compositional ratios of the metal elements in the precursor obtained in the niobium coating step are not altered by the subsequent firing step. Thus, the composition ratio of the metal elements in the resulting precursor is preferably made to match the desired compositional ratio of the final positive active material.

(3) Heat Treatment Step

Next, the precursor (nickel-containing hydroxide coated with niobium compound) is mixed with a lithium compound to obtain a lithium mixture, but in the manufacturing method of the present invention an additional heat treatment step can be included in which the precursor is heat treated prior to being mixed with the lithium compound. A compound including the additional element M can also be added in this step.

With the heat treatment step, it is possible to remove moisture contained in the precursor and reduce the amount of residual moisture that remains in the precursor through the firing step. By thoroughly removing residual moisture from the precursor, it is possible to prevent variation in the ratio (Li/Me) of atoms of lithium (Li) to atoms of metals other than lithium (Me) in the manufactured positive active material. Since only enough moisture needs to be removed to prevent Li/Me variation in the positive active material, it is not absolutely necessary to convert all of the hydroxide (composite hydroxide) in the nickel-containing hydroxide coated with the niobium compound to a composite oxide. However, preferably all of the composite hydroxide in the precursor is converted to a composite oxide in order to reduce Li/Me variation. In the heat treatment step, the precursor can be heated up to a temperature at which the residual moisture is removed—preferably 105° C. to 800° C. For example, the residual moisture can be removed by heating the composite oxide to 105° C. or more. Temperatures below 105° C. are not industrially suitable because a long time is then required to remove the residual moisture. Above 800° C., the particles converted to the composite oxide may be sintered and aggregated. When converting a composite hydroxide to a composite oxide, heating is preferably at a temperature of 350° C. to 800° C.

The atmosphere for heat treatment is not particularly limited, but a stream of air is preferred for reasons of simplicity. The heat treatment time is also not particularly limited, but at least one hour is preferred because the residual moisture may not be thoroughly removed from the composite hydroxide if the time is less than an hour, and 5 to 15 hours is more preferred. The equipment used for heat treatment is not particularly limited, and may be any capable of heating the composite hydroxide in a stream of air, but it is desirable to use a drying oven or an electric furnace that does not generate gas.

(4) Mixing Step

Next, the precursor obtained from the niobium coating step or heat treatment step is mixed with a lithium compound. The precursor and lithium compound are mixed so as to obtain a Li/Me ratio of 0.95 to 1.20 in the lithium mixture. In other words, they are mixed so that the Li/Me ratio in the lithium mixture is the same as the Li/Me ratio in the positive active material of the invention. That is, since the Li/Me ratio is the same before and after the firing step, the Li/Me ratio in this mixing step will become the Li/Me ratio of the positive active material.

When water washing is performed after firing as discussed below, the Li/Me ratio is reduced by water washing. Therefore, when water washing is to be performed, the reduction in the Li/Me is preferably accounted for when mixing the precursor with the lithium compound. The reduction in the Li/Me ratio is about 0.05 to 0.1, with variations according to the firing conditions and washing conditions, and the reduction can be confirmed by manufacturing a small amount of the positive active material in a preliminary test. The lithium compound is not particularly limited, but lithium hydroxide, lithium nitrate, lithium carbonate or a mixture of these is preferred from the standpoint of wider availability. In particular, lithium hydroxide is preferred from the standpoint of ease of handling and stable quality.

The lithium mixture is preferably mixed thoroughly before being fired. If it is not thoroughly mixed, there may be variation in the Li/Me ratio between individual particles, and adequate battery characteristics may not be obtained among other problems. An ordinary mixer can be used for mixing, such as a shaker mixer, Loedige mixer, Julia mixer, V-blender or the like, and the precursor and lithium compound can be mixed thoroughly to a degree that does not disrupt the structure of the composite hydroxide particles or the like.

(5) Firing Step

In the firing step, the lithium mixture obtained in the previous mixing step is fired in an oxidizing atmosphere at 700° C. to 830° C., or preferably 700° C. to 820° C., or more preferably 700° C. to 800° C. to form a lithium-transition metal composite oxide consisting of particles with a polycrystalline structure. When the lithium mixture is fired in the firing step, the lithium in the lithium compound disperses in the precursor, forming the lithium-transition metal compound oxide. A firing temperature of less than 700° C. is not sufficient to disperse the lithium in the precursor, so that excess lithium and unreacted particles remain, resulting in an incomplete crystal structure and unsatisfactory battery characteristics. If the firing temperature exceeds 830° C., on the other hand, excessive sintering may occur between particles of the formed lithium-transition metal composite oxide, and abnormal particle growth may occur. When abnormal particle growth occurs, the particles may be too coarse after firing and it may not be possible to maintain the shape of the particles, so that when the positive active material is formed the specific surface area is reduced, increasing the resistance of the positive electrode and reducing the battery capacity.

The firing time is preferably at least 3 hour or more, or preferably 6 to 24 hours. Below 3 hours, sufficient lithium-transition metal composite oxide may not be produced. The atmosphere during firing is preferably an oxidizing atmosphere, and an atmosphere with an oxygen concentration of 18 to 100 vol % is preferred. That is, firing is preferably performed in atmosphere or an oxygen stream. This is because if the oxygen concentration is less than 18 vol %, adequate oxidation may not occur, and the lithium-transition metal composite oxide may not be sufficiently crystalline. From the standpoint of the battery characteristics in particular, firing is preferably performed in an oxygen stream.

Prior to being fired at 700° to 830° C. in the firing step, the lithium mixture is preferably pre-fired at a temperature lower than the firing temperature, which is a temperature at which the lithium compound can react with the precursor. By maintaining the lithium mixture at such a temperature, it is possible to thoroughly disperse the lithium in the precursor and obtain a uniform lithium-transition metal composite oxide. When using lithium hydroxide for example, pre-firing is preferably performed by maintaining a temperature of 400° to 550° C. for about 1 to 10 hours.

The furnace used in the firing step is not particularly limited, and may be any capable of firing the lithium mixture in air or an oxygen stream, but an electric furnace that does not produce gas is preferred, and either a batch-type or continuous-type furnace may be used.

Although sintering between particles is controlled in the lithium-transition metal composite oxide obtained by firing, coarse particles may be formed by weak sintering or aggregation. In such cases, the particles are preferably crushed to break up sintering and aggregates and adjust the particle size distribution.

(6) Water Washing Step

The water washing step is a step of washing and then filtering and drying the lithium-transition metal composite oxide.

The lithium-transition metal composite oxide obtained in the firing step can be used as is as a positive active material, but preferably it is water washed after being fired because the surface area available for contact with the electrolyte solution can be increased and the charge-discharge capacity improved by removing the excess lithium on the particle surfaces. Also, contact with the electrolyte solution can also be increased and the charge-discharge capacity can be improved because weak areas formed on the particle surfaces are thoroughly removed by water washing.

Moreover, water washing is also desirable from a safety standpoint because excess lithium can produce side-reactions in nonaqueous secondary batteries, causing battery swelling due to gas production.

For the slurry concentration during water washing, the amount of the lithium-transition metal composite oxide (g) per 1 L of water contained in the slurry is preferably 100 to 2000 g/L or more preferably 500 to 1600 g/L. The higher the slurry concentration the greater the amount of powder, and above 2000 g/L the viscosity is extremely high, making agitation difficult, delaying the dissolution speed of the adhering matter for reasons of equilibrium due to the high alkali level in the liquid, and making separation from the powder difficult even when detachment occurs. More specifically, if the slurry concentration is less than 100 g/L, on the other hand, more lithium is eluted because the slurry is too dilute, reducing the amount of surface lithium but also causing lithium detachment from the crystal lattice of the positive active material, which not only makes the crystals more fragile, but also causes re-precipitation of lithium carbonate when the high pH aqueous solution absorbs carbon dioxide gas from the atmosphere.

The water used for water washing is not particularly limited, but is preferably pure water. Loss of battery performance due to adherence of impurities to the positive active material can be prevented by using pure water.

The residual amount of water adhering to the particle surfaces during solid-liquid separation (filtration) of the slurry is preferably as small as possible. When the amount of adhering water is high, the lithium dissolved in the liquid is re-precipitated, increasing the amount of lithium on the surfaces of the lithium-transition metal composite oxide particles after drying.

The temperature for drying is not particularly limited, but is preferably 80° C. to 350° C. Below 80° C., drying of the positive active material after water washing is delayed, and a lithium concentration gradient appears between the particle surfaces and the inside of the particles, detracting from the battery characteristics. Moreover, because it is expected that conditions will closely approximate stoichiometric proportions near the surfaces of the positive active material, or else approach a charged state after some lithium detachment, there is a risk that crystal structures near the charged state will be broken down at temperatures above 350° C., detracting from the battery characteristics.

The drying time is not particularly limited, but is preferably 2 to 24 hours.

2. Positive Active Material for Non-Aqueous Electrolyte Secondary Battery

The positive active material for a nonaqueous electrolyte secondary battery of the present invention consists of a lithium-transition metal composite oxide represented by the General Formula $Li_dNi_{1-a-b-c}Co_aM_bNb_cO_2$ (where M is at least one element selected from Mn, V, Mg, Ti and Al, and $0.05 \le a \le 0.35$, $0 \le b \le 0.10$, $0.006 \le c \le 0.06$, and $0.95 \le d \le 1.20$ are established) and composed of particles with a polycrystalline structure, and the positive active material for a non-aqueous electrolyte secondary battery has a porous structure and a specific surface area of 2.0 to 7.0 $m^2/g$.

The a representing the cobalt content in the formula has a value of $0.05 \le a \le 0.35$, or preferably $0.07 \le a \le 0.20$, or more preferably $0.10 \le a \le 0.20$. Cobalt is an additional element that helps to improve the cycle characteristics, and if the value of a is less than 0.05, adequate cycle characteristics cannot be obtained, and the capacity retention rate also declines. If the value of a exceeds 0.35, on the other hand, there is a greater drop in the initial discharge capacity.

The c representing the niobium content in the formula and has a value of $0.006 \le c \le 0.06$, or preferably $0.006 \le c \le 0.05$, or more preferably $0.006 \le c \le 0.04$. If the value of c is less than 0.006, safety will not be sufficiently improved because the added amount is too small. Although safety improves more when more is added, the charge-discharge capacity declines if the value of c exceeds 0.06. A reduction in the cycle characteristics has also been observed.

Niobium is an additional element that is believed to help control thermal decomposition reactions due to deoxygenation of the lithium-transition metal compound, and has a safety improving effect. The niobium may be present in solid solution in the lithium-transition metal composite oxide, or may be in the form of a lithium-niobium composite oxide at the crystal grain boundaries or on the particle surfaces of the lithium-transition metal composite oxide, but is preferably in solid solution. "Solid solution" here means a condition in which almost no niobium compound is detected as particles by energy dispersive X-ray spectroscopy (EDX measurement) using a transition electron microscope.

In the case of a solid solution, the ratio of the niobium concentrations at the crystal grain boundaries and inside the particles (crystal grain boundary Nb concentration/intraparticle Nb concentration) is preferably 4 or less or more preferably 3 or less. The ratio of the Nb concentrations at the crystal grain boundaries and inside the particles can be determined from the results of EDX measurement using a transmission electron microscope. The effect of suppressing thermal decomposition reactions can be improved by using a solid solution even if only a small amount of niobium is added.

The additional element M is at least one kind of element selected from Mn, V, Mg, Ti and Al. The value of b representing the content of M satisfies $0 \le b \le 0.10$, or preferably $0.01 \le b \le 0.07$. M can be added to improve the cycle characteristics, safety and other battery characteristics. If the value of b representing the added amount of M exceeds 0.10, the battery characteristics are more improved, but there is a greater decline in the initial discharge characteristics, and this is not preferable. A b value in the range of $0 < b \le 0.10$ (meaning that some M is included) is preferably because it produces superior cycle characteristics.

The value of d representing the molar ratio (Li/Me) of lithium to the metal other than lithium (Me) is $0.95 \le d \le 1.20$, or preferably $0.98 \le d \le 1.10$. The charge-discharge capacity is reduced if the value of d is less than 0.95. The charge-discharge capacity increases as the value of d increases, but safety is adversely affected if d exceeds 1.20.

The contents of the various components of this lithium-transition metal composite oxide can be measured by assay analysis using the inductively coupled plasma (ICP) method.

The positive active material consists of a lithium-transition metal composite oxide composed of particles with a polycrystalline structure, and the material has a porous structure. In this Description, a porous structure is one with a void number of at least $2/\mu m$, or preferably at least $3/\mu m$, or more preferably at least $4/\mu m$, with the void number being an index obtained by counting the number of voids of a verifiable size by observation (5000× magnification) of an arbitrary cross-section (observation plane) under a scanning electron microscope for any 20 or more particles, and dividing the total number of voids by the long cross-sectional diameter ($\mu M$) of the particles. A verifiable size here means that the distance between any two points on the outer edge of a void in the observation plane is at least $0.3\mu$, while the longest cross-sectional diameter is the maximum distance between two arbitrary points on the particle circumference in the particle observation plane. In this cross-sectional observation, particles having a diameter equal to 20% or less of the volume-average particle diameter (MV) of the subsequent positive active material are excluded from the evaluation of porous structure. This is because particles having a diameter equal to 20% or less of the average particle diameter are a small part of the positive active material and have little effect on the charge-discharge capacity, and because the observational plane of such a particle may be a cross-section of a particle end and therefore not suitable for particle evaluation. The maximum length of the voids is preferably 50% or less or more preferably 40% or less of the longest cross-sectional particle diameter in cross-sectional observation under a scanning electron microscope, and are preferably present at least at the crystal grain boundaries. With such a porous structure, it is possible to greatly increase the particle surface that contacts the electrolyte solution when the material is used as the positive electrode of a battery, compensate for the decrease in charge-discharge capacity caused by niobium addition, and obtain a satisfactory charge-discharge capacity while ensuring safety.

The average particle diameter of the positive active material can be measured by the laser diffraction and scattering method, and the volume-average particle diameter (MV) is preferably 5 to 20 $\mu m$. Below 5 $\mu m$, the filling density is lower when the material is used in the positive electrode of a battery, and a sufficient charge-discharge capacity per volume may not be obtained. Above 20 $\mu m$, on the other hand, the contact area with the electrolyte solution may not be sufficient, detracting from the charge-discharge capacity.

Moreover, the mesopore volume of the positive active material is preferably 0.0025 to 0.0200 ml/g, or more preferably 0.003 to 0.015 ml/g. A mesopore is a pore that can be measured by the nitrogen adsorption method even though it is too small to be verified adequately in cross-sectional observation under a scanning electron microscope, and which can be used to evaluate the amount of fine pores in the positive active material. With a mesopore volume within the aforementioned range, contact of the positive active material with the electrolyte solution is increased, and the charge-discharge capacity is further improved.

The positive active material has a specific surface area of 2.0 to 7.0 $m^2/g$, or preferably 2.4 to 5.0 $m^2/g$, or more preferably 2.4 to 4.5 $m^2/g$. If the specific surface area is less than 2.0 $m^2/g$, a sufficient charge-discharge capacity is not obtained because the particle surface capable of contacting the electrolyte solution is too small. If the specific surface area exceeds 7.0 m$^2$/g, on the other hand, safety declines because the surface area in contact with the electrolyte solution is too large.

The specific surface area is a value measured by the BET method.

The crystallite diameter of the lithium-transition metal composite oxide is preferably 10 to 150 nm, or more preferably 10 to 130 nm, or still more preferably 10 to 100 nm. If the crystallite diameter is less than 10 nm, a sufficient charge-discharge capacity may not be obtained due to increased resistance of the active material because the number of crystal grain boundaries is too great. If the crystallite diameter exceeds 150 nm, on the other hand, crystal growth may progress to far, leading to cation mixing in which nickel mixes with the lithium layer of the lithium-transition metal composite oxide (which is a layered compound), reducing the charge-discharge capacity.

The crystallite diameter is a value calculated from the (003) peak in X-ray diffraction (XRD) measurement.

3. Nonaqueous Electrolyte Secondary Battery

Embodiments of the nonaqueous electrolyte secondary battery of the present invention are explained in terms of their constituent elements. The components of the nonaqueous electrolyte secondary battery of the present invention are similar to those of an ordinary lithium-ion secondary battery, and include a positive electrode, a negative electrode and a nonaqueous electrolyte solution. The embodiments explained below are only examples, and the nonaqueous electrolyte secondary battery of the present invention can be implemented with a variety of changes and improvements based on the knowledge of a person skilled in the art, using the following embodiments as a starting point. There are no particular limitations on the uses of the nonaqueous electrolyte secondary battery of the present invention.

(1) Positive Electrode

The positive electrode mix for forming the positive electrode and the individual materials constituting the mix are explained below. The positive active material of the invention in powder form is mixed with a conductive material and a binder, active carbon and a solvent for adjusting the viscosity and the like are added as necessary, and the mixture is kneaded to prepare a positive electrode mix paste. The mixing ratios of the components in the positive electrode mix are important for determining the properties of the lithium secondary battery.

As in a positive electrode of an ordinary lithium secondary battery, a positive active material content of 60 to 95 mass %, a conductive material content of 1 to 20 mass %, and a binder content of 1 to 20 mass % are desirable given 100 mass % as the total mass of the solid component of the positive electrode mix excluding the solvent.

The resulting positive electrode mix paste is coated on the surface of an aluminum foil collector for example, and dried to disperse the solvent. This may also be pressed as necessary with a roll press or the like to increase the electrode density. A sheet-shaped positive electrode can be prepared in this way. A sheet-shaped positive electrode can be cut or the like to a suitable size for the target battery, and used in battery preparation. However, the method of preparing the positive electrode is not limited by the example above, and other methods may be employed.

Graphite (natural graphite, artificial graphite, expanded graphite or the like) or a carbon black material such as acetylene black or Ketjen black may be used as a conductive agent when preparing the positive electrode. Polyvinylidene fluoride, polytetrafluoroethylene, ethylene propylene diene rubber, fluorine rubber, styrene butadiene, cellulose resin, polyacrylic acid or the like may be used as a binder.

Because the binder serves to hold the active material particles together, a fluorinated resin such as polytetrafluoroethylene, polyvinylidene fluoride or fluorine rubber or a thermoplastic resin such as polypropylene, polyethylene or the like may be used. A solvent that disperses the positive active material, conductive material and active carbon and dissolves the binder may be added to the positive electrode mix as necessary. Specifically, an organic solvent such as N-methyl-2-pyrrolidone may be used as the solvent. Active carbon may also be added to the positive electrode mix to increase the electrical double layer capacity.

(2) Negative Electrode

The negative electrode is formed by mixing a binder with metal lithium, lithium alloy or the like or a negative electrode active material capable of storing and releasing lithium, and adding a suitable solvent to obtain a pasty negative electrode mix that is then coated on the surface of a copper or other metal foil collector, dried, and pressed as necessary to increase the electrode density.

A calcined form of an organic compound such as natural graphite, artificial graphite, phenol resin or the like or a powdered form of a carbon material such as coke can be used as the negative active material. In this case, as in the case of the positive electrode, a fluorine resin such as a polyvinylidene fluoride can be used as a negative electrode binder, and N-methyl-2-pyrrolidone or another organic solvent can be used as a solvent to disperse the active material and the binder.

(3) Separator

A separator is disposed between the positive and negative electrodes. The separator separates the positive and negative electrodes and holds the electrolyte, and a thin film of, for example, polyethylene and polypropylene having multiple small holes may be used.

(4) Nonaqueous Electrolyte Solution

The nonaqueous electrolyte solution consists of a lithium salt as a supporting salt, dissolved in an organic solvent. One of the cyclic carbonates such as ethylene carbonate, propylene carbonate, butylene carbonate and trifluoropropylene carbonate, the linear carbonates such as diethylene carbonate, dimethyl carbonate, ethylmethyl carbonate and dipropyl carbonate, the ether compounds such as tetrahydrofuran, 2-methyl tetrahydrofuran and dimethoxyethane, the sulfur compounds such as ethylmethyl sulfone and butanesultone and the phosphorus compounds such as triethyl phosphate, trioctyl phosphate may be used alone, or two or more of these may be mixed and used as the organic solvent.

LiPF$_6$, LiBF4, LiClO$_4$, LiAsF$_6$, LiN(CF$_3$SO$_2$)$_2$ and the like and composite salts of these may be used as supporting salts.

The nonaqueous electrolyte solution may also contain a radical capture agent, a surfactant, a flame retardant and the like.

(5) Battery Shape and Configuration

A lithium secondary battery of the present invention configured with the positive electrode, negative electrode, separator and nonaqueous electrolyte solution described above may be made in a variety of shapes including cylindrical, stacked and the like.

Whatever shape is adopted, the positive electrode and negative electrode are stacked with the separator in between to form an electrode body, which is then impregnated with the nonaqueous electrolyte solution. Current collection leads or the like are used to connect the positive collector to the positive terminal communicating with the outside and the negative collector to the negative terminal communicating with the outside. A configuration of this sort can be sealed inside a battery case to complete the battery.

EXAMPLES

The present invention is explained in more detail below based on examples of the present invention and comparative examples, but the present invention is not in any way limited by these examples.

Example 1

(Crystallization Step)

Nickel sulfate and cobalt sulfate were mixed to a nickel:cobalt molar ratio of 84.0:16.0, to obtain a mixed aqueous solution. Next, 25 mass % of sodium hydroxide solution and 25 mass % of ammonia water were added simultaneously with agitation to the mixed aqueous solution in the reaction tank, to obtain an aqueous reaction solution. The aqueous reaction solution was maintained at a pH of 11.8 (25° C. basis), a reaction temperature of 50° C. and an ammonia concentration of 10 g/L, to form a nickel-containing hydroxide (nickel-cobalt composite hydroxide) consisting of spherical secondary particles by co-precipitation. Once the inside of the reaction tank had stabilized, a slurry containing a nickel-cobalt composite hydroxide was collected from the overflow port, filtered, water washed and then dried to obtain a nickel-cobalt composite hydroxide.

(Coating Step)

Next, niobic acid ($Nb_2O_5 \cdot xH_2O$) powder was dissolved in potassium hydroxide solution (300 g/L) to a niobium concentration of 30 g/L by 6 hours of agitation with the dissolution temperature maintained at 80° C., and the residue was filtered out to prepare a niobium salt solution.

The niobium salt solution and a 25 mass % aqueous sulfuric acid solution were dripped simultaneously into a slurry of the aforementioned nickel-cobalt composite oxide mixed with pure water so as to obtain a pH of 8.0 while maintaining a liquid temperature of 25° C., to obtain a nickel-cobalt composite hydroxide coated with a niobium compound. For the added amount of niobium, the molar ratio of niobium to metal other than lithium (Me) (hereunder called the target amount of added niobium c') assuming that all of the niobium contained in the added niobium salt solution is incorporated into the lithium-transition metal composite oxide was given as 0.03.

(Mixing Step)

Using the coated nickel-cobalt composite hydroxide as a precursor, commercial lithium hydroxide was weighed to a Li/Me ratio of 1.10, and thoroughly mixed using a shaker mixer (Willy A. Bachofen (WAB) Turbula Type T2C) in such a way that the structure of the precursor was maintained, to obtain a lithium mixture.

(Firing Step)

This lithium mixture was inserted into a magnesium firing container, and the temperature was raised to 500° C. at a rate of 2.77° C./minute in an oxygen stream with a flow rate of 6 L/minute in a sealed electric furnace, and maintained at 500° C. for 3 hours. Next, the temperature was raised to 780° C. at a similar rate and maintained for 12 hours, after which the furnace was cooled to room temperature to obtain a lithium-transition metal composite oxide.

(Water Washing Step)

The resulting lithium-transition metal composite oxide was mixed with pure water to a slurry concentration of 1500 g/L to prepare a slurry, water washed for 30 minutes in the slurry, and filtered. After filtration, this was maintained for 14 hours at 210° C. with a vacuum drier, and cooled to room temperature to obtain a positive active material. As the manufacturing conditions, Table 1 shows the target amount of added niobium, the pH value in the coating step and the firing temperature.

When a cross-section of the resulting positive active material was observed under a transmission electron microscope, no heterogenous phase was observed, and EDX analysis confirmed that the niobium was uniformly distributed in the positive active material particles, and that the ratio of the niobium concentrations at the crystal grain boundaries and inside the particles (crystal grain boundary Nb concentration/intraparticle Nb concentration) was 3 or less. An index of porosity was calculated from the void number and the long cross-sectional particle diameter (μm) based on observation under a scanning electron microscope, and used to evaluate the presence or absence of a porous structure with the results shown in Table 2.

The composition of the resulting positive active material was analyzed by the ICP method, the specific surface area was determined by the BET method, and the volume-average particle diameter (MV) was determined by laser scattering analysis. The mesoparticle volume was determined by the nitrogen adsorption method, and the crystallite diameter was calculated by Scerrer's formula using the 2θ and half-width of the (003) plane in the diffraction pattern obtained by XRD measurement. The composition, volume-average particle diameter, specific surface area, mesopore volume and crystallite diameter are shown in Table 2.

[Evaluation of Initial Discharge Capacity]

Figure 1:
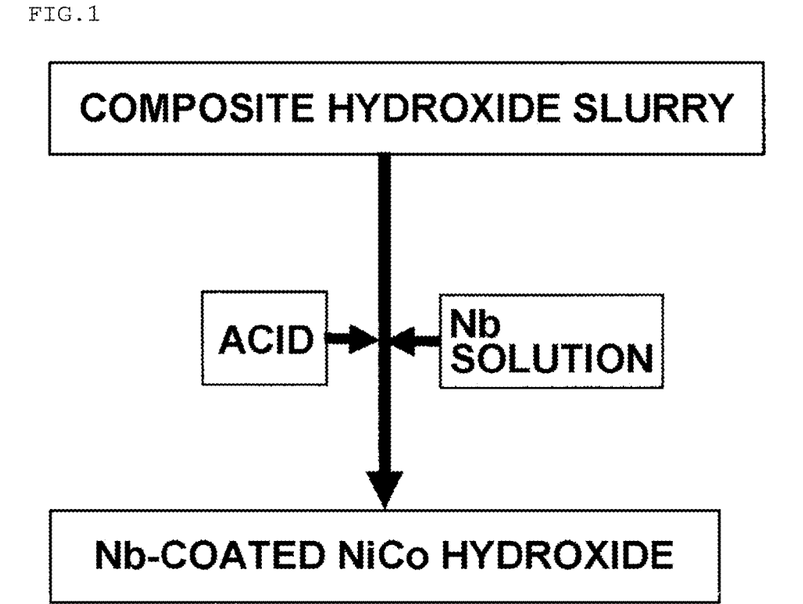
FIG. 1 is a flow chart of a niobium compound coating process.
Figure 2:
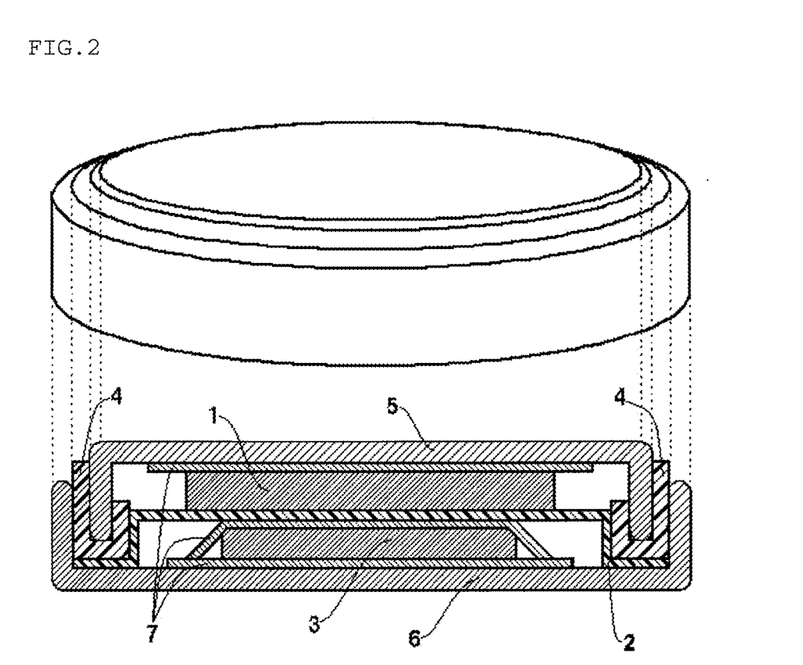
FIG. 2 shows a cross-section of a coin battery used in battery evaluation.

The initial capacity of the resulting positive active materials was evaluated as follows. 20 mass % of acetylene black and 10 mass % of PTFE was mixed with 70 mass % of active material powder, and 150 mg of this was taken and a pellet was prepared as a positive electrode. Lithium metal was used for the negative electrode, and a mixed solution of equal parts of ethylene carbonate (EC) and diethyl carbonate (DEC) with 1 M $LiClO_4$ as the supporting salt (Tomiyama Pure Chemical Industries) was used as the electrolyte solution. A 2032 coin battery was prepared as shown in FIG. 2 in a glove box with an Ar atmosphere controlled to a dew point of −80° C.

The prepared battery was left for about 24 hours, and once the open circuit voltage (OCV) had stabilized, the battery was charged to a cut-off voltage of 4.3 V with a current density of 0.5 $mA/cm^2$ at the positive electrode to determine the initial charge capacity. After resting for 1 hour, the battery was discharged to a cut-off voltage of 3.0 V to determine the initial discharge capacity.

[Evaluation of Cycle Characteristics]

The cycle characteristics were evaluated as follows. Each battery was CC charged to 4.4 V (charge voltage needs to be verified) at a rate of 1 C and a temperature of 25°, left to rest for 10 minutes, and then CC discharged to 3.0 V at the same rate and left to rest for 10 minutes, and this charge-discharge cycle was repeated 200 times. The discharge capacities of the first cycle and the $200^{th}$ cycle were measured, and the 2 C discharge capacity of the $200^{th}$ cycle as a percentage of the 2 C discharge capacity of the first cycle was given as the capacity retention rate (%).

[Safety Evaluation of Positive Electrode]

The safety of the positive electrode was evaluated by CCCV charging a 2032 coin battery prepared by methods similar to those described above to a cut-off voltage of 4.5 V (constant current/constant voltage charging: charging using a two-phase charging process in which charging first operates at a constant current, and charging is then completed at a constant voltage), and then taking apart the battery and removing the positive electrode while taking care not to cause a short-circuit. 3.0 mg of the electrode was measured out, 1.3 mg of electrolyte solution was added, they were sealed in an aluminum measurement container, the exothermal behavior was measured with a PTC-10A (Rigaku) differential scanning calorimeter (DSC) as the temperature was raised from room temperature to 300° C. at a rate of 10° C./rain, and safety was evaluated from the height of the maximum exothermal peak. The results of evaluation of the positive active materials are shown together in Table 1.

Example 2

A positive active material was obtained and evaluated as in Example 1 except that the target added amount of niobium c' was changed to 0.05 and the pH of the slurry during the coating step was changed to 7.0. The manufacturing conditions are shown in Table 1, and the evaluation results for the resulting positive active material are shown in Table 2.

Example 3

A positive active material was obtained and evaluated as in Example 1 except that a sodium aluminate aqueous solution, a 25 mass % sodium hydroxide solution and 25 mass % ammonia water were added simultaneously to a mixed aqueous solution of nickel sulfate and cobalt sulfate in a reaction tank to obtain a molar nickel:cobalt:aluminum ratio of 81.5:15.0:3.5, and the target added amount of niobium c' was changed to 0.01.

Figure 3:
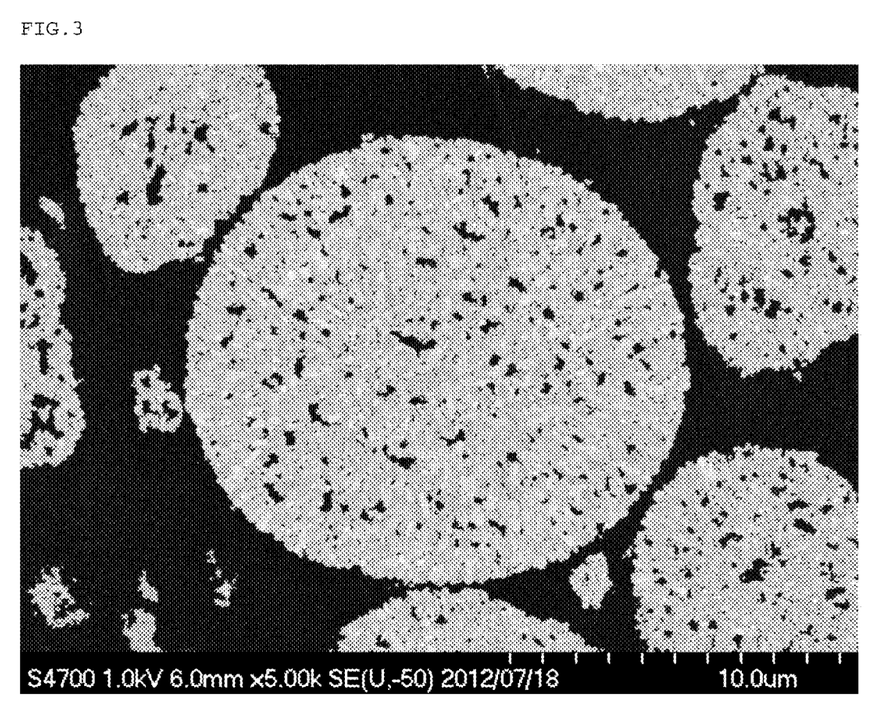
FIG. 3 is a scanning electron microscope image showing particles of the positive active material obtained in Example 3 in cross-section.

When a cross-section of the resulting positive active material was observed under a transmission electron microscope, no heterogenous phase was observed, and EDX analysis confirmed that the niobium was uniformly distributed in the positive active material particles, and that the ratio of the Nb concentrations at the crystal grain boundaries and inside the particles (crystal grain boundary Nb concentration/intraparticle Nb concentration) was 3 or less. FIG. 3 shows the results of observation of a cross-section of a particle of the positive active material under a scanning electron microscope. The manufacturing conditions are shown in Table 1, and evaluation results for the resulting positive active material in Table 2.

Example 4

A positive active material was obtained and evaluated as in Example 1 except that a mixed aqueous solution of nickel sulfate and cobalt sulfate, a sodium aluminate aqueous solution, a 25 mass % sodium hydroxide solution and 25 mass % ammonia water were added simultaneously to a reaction tank to obtain a molar nickel:cobalt:aluminum ratio of 81.5:15.0:3.5, the target added amount of niobium c' was changed to 0.01, and the pH during the coating process was changed to 10.0. The manufacturing conditions are shown in Table 1, and the evaluation results for the resulting positive active material are shown in Table 2.

Example 5

A positive active material was obtained and evaluated as in Example 1 except that a mixed aqueous solution of nickel sulfate and cobalt sulfate, a sodium aluminate aqueous solution, a 25 mass % sodium hydroxide solution and 25 mass % ammonia water were added simultaneously to a reaction tank to obtain a molar nickel:cobalt:aluminum ratio of 81.5:15.0:3.5, the target added amount of niobium c' was changed to 0.01, and the firing temperature was changed to 700° C. The manufacturing conditions are shown in Table 1, and the evaluation results for the resulting positive active material are shown in Table 2.

Example 6

A positive active material was obtained and evaluated as in Example 1 except that a mixed aqueous solution of nickel sulfate and cobalt sulfate, a sodium aluminate aqueous solution, a 25 mass % sodium hydroxide solution and 25 mass % ammonia water were added simultaneously to a reaction tank to obtain a molar nickel:cobalt:aluminum ratio of 81.5:15.0:3.5, and the firing temperature was changed to 830° C. The manufacturing conditions are shown in Table 1, and the evaluation results for the resulting positive active material are shown in Table 2.

Comparative Example 1

A positive active material was obtained and evaluated as in Example 1 except that the pH during the coating process was changed to 12.0. The manufacturing conditions are shown in Table 1, and the evaluation results for the resulting positive active material are shown in Table 2.

Comparative Example 2

A positive active material was obtained and evaluated as in Example 1 except that the firing temperature was changed to 850° C. The manufacturing conditions are shown in Table 1, and the evaluation results for the resulting positive active material are shown in Table 2.

Comparative Example 3

A positive active material was obtained and evaluated as in Example 1 except that the target amount of added niobium c was changed to 0.07. The manufacturing conditions are shown in Table 1, and the evaluation results for the resulting positive active material are shown in Table 2.

Comparative Example 4

A positive active material was obtained and evaluated as in Example 1 except that a mixed aqueous solution of nickel sulfate and cobalt sulfate, a sodium aluminate aqueous solution, a 25 mass % sodium hydroxide solution and 25 mass % ammonia water were added simultaneously to a reaction tank to obtain a molar nickel:cobalt:aluminum ratio of 81.5:15.0:3.5, no coating step was performed, and the firing temperature was set at 740° C. The manufacturing conditions are shown in Table 1, and the evaluation results for the resulting positive active material are shown in Table 2.

TABLE 1

|  | Target amount of added niobium c' | Coating step pH value | Firing temperature (° C.) |
| --- | --- | --- | --- |
| Example 1 | 0.03 | 8.0 | 780 |
| Example 2 | 0.05 | 7.0 | 780 |

TABLE 1-continued

| | Target amount of added niobium c' | Coating step pH value | Firing temperature (° C.) |
|---|---|---|---|
| Example 3 | 0.01 | 8.0 | 780 |
| Example 4 | 0.01 | 10.0 | 780 |
| Example 5 | 0.01 | 8.0 | 700 |
| Example 6 | 0.03 | 8.0 | 830 |
| Comp Ex 1 | 0.03 | 12.0 | 780 |
| Comp Ex 2 | 0.03 | 8.0 | 850 |
| Comp Ex 3 | 0.07 | 8.0 | 780 |
| Comp Ex 4 | — | — | 740 |

TABLE 2

| | Lithium-transition metal composite oxide composition | Volume-average particle diameter (μm) | Porous structure | Void number (#/μm) | Specific surface area ($m^2/g$) | Mesopore volume (ml/g) | Crystallite diameter (nm) | Initial discharge capacity (mAh/g) | Maximum exothermal peak (cal/s/g) | 200-cycle capacity retention rate (%) |
|---|---|---|---|---|---|---|---|---|---|---|
| E1 | $Li_{1.04}(Ni_{0.815}Co_{0.155}Nb_{0.03})O_2$ | 12.14 | ○ | 7.2 | 3.59 | 0.0076 | 57 | 194.3 | 1.2 | 80.3 |
| E2 | $Li_{1.00}(Ni_{0.798}Co_{0.152}Nb_{0.05})O_2$ | 11.95 | ○ | 8.6 | 4.61 | 0.0071 | 55 | 178.6 | 0.9 | 77.4 |
| E3 | $Li_{1.05}(Ni_{0.807}Co_{0.148}Al_{0.035}Nb_{0.01})O_2$ | 12.31 | ○ | 8.1 | 3.56 | 0.0067 | 87 | 197.1 | 1.4 | 88.1 |
| E4 | $Li_{1.05}(Ni_{0.807}Co_{0.148}Al_{0.035}Nb_{0.01})O_2$ | 12.78 | ○ | 6.9 | 3.53 | 0.0058 | 89 | 196.1 | 1.4 | 82.0 |
| E5 | $Li_{1.05}(Ni_{0.807}Co_{0.148}Al_{0.035}Nb_{0.01})O_2$ | 11.87 | ○ | 11.9 | 3.61 | 0.0091 | 15 | 187.6 | 1.0 | 82.2 |
| E6 | $Li_{1.05}(Ni_{0.790}Co_{0.146}Al_{0.034}Nb_{0.03})O_2$ | 13.06 | ○ | 3.7 | 2.95 | 0.0049 | 144 | 187.4 | 1.7 | 78.6 |
| CE1 | $Li_{1.04}(Ni_{0.836}Co_{0.159}Nb_{0.005})O_2$ | 12.33 | X | 1.8 | 3.49 | 0.0032 | 109 | 209.4 | 7.5 | 82.1 |
| CE2 | $Li_{1.04}(Ni_{0.815}Co_{0.155}Nb_{0.03})O_2$ | 13.24 | X | 1.1 | 1.91 | 0.0027 | 176 | 164.5 | 2.4 | 60.6 |
| CE3 | $Li_{1.04}(Ni_{0.781}Co_{0.149}Nb_{0.07})O_2$ | 12.01 | ○ | 12.3 | 5.63 | 0.0098 | 47 | 140.5 | 0.3 | 72.2 |
| CE4 | $Li_{1.04}(Ni_{0.815}Co_{0.150}Al_{0.035})O_2$ | 12.85 | X | 0.6 | 1.47 | 0.0024 | 134 | 196.2 | 7.0 | 83.5 |

[Evaluation]

As shown in Table 1, in Examples 1 to 6 of the present invention the initial discharge capacities of the resulting positive active materials were generally above 180 mAh/g, showing that these materials can be used as positive active materials. The capacity retention rates were about 80%, showing that these materials have excellent cycle characteristics. It is thought that when M is present ($0 < b \leq 0.1$), the structure of the positive active material is stabilized during repeated charge and discharge, resulting in excellent cycle characteristics. The maximum exothermal peak height according to DSC measurement was 1.5 cal/sec/g or less, showing that the amount of heat generation was greatly reduced in comparison with the conventional positive active material of Comparative Example 4 having no added niobium.

In Comparative Example 1, in which the pH was controlled to 12.0 in the coating step, the added amount of niobium in the resulting positive active material was 0.005, or ⅙ the target added amount in the coating step due to detachment of the niobium compound during coating. As a result, the maximum exothermal peak height was an extremely high (7.5 cal/sec/g), indicating poor thermal stability.

In Comparative Example 2, firing at a high temperature resulted in cation mixing, in which nickel became mixed with the lithium layer of the lithium-transition metal composite oxide (which is a layered compound), greatly reducing the initial discharge capacity. The maximum exothermal peak height is also high.

In Comparative Example 3, the initial discharge capacity was greatly reduced (to 140.5 mAh/g) because the added amount of niobium was high (0.07). The cycle characteristics were also reduced.

Comparative Example 4 is a conventional positive active material without added niobium, and while the initial discharge capacity is high and the cycle characteristics are good, the maximum exothermal peak height is extremely high (7.0 cal/sec/g), indicating poor thermal stability.

INDUSTRIAL APPLICABILITY

The nonaqueous electrolyte secondary battery of the present invention is highly safe and has a high initial capacity and excellent cycle characteristics, making it suitable for use as a power source for small portable electronic devices that require constantly high capacities and long battery lives.

In stationary storage batteries and power sources for electric vehicles, it has become more difficult to ensure safety due to the increasing size of the battery, and moreover expensive protective circuits must be installed to ensure a high degree of safety. However, with the lithium-ion secondary battery of the present invention it is easy to ensure safety because the battery is extremely safe, and expensive protective circuits can be omitted, making this suitable as a stationary storage battery or a power source for an electric vehicle from the standpoint of low cost. Power sources for electric vehicles include not only power sources for electric vehicles that are driven purely by electrical energy, but also power sources for hybrid vehicles that also employs gasoline engines, diesel engines and other combustion engines

REFERENCE SIGNS LIST

1 Lithium metal negative electrode
2 Separator (impregnated with electrolyte solution)
3 Positive electrode (electrode for evaluation)
4 Gasket
5 Negative electrode case
6 Positive electrode case
7 Collector

The invention claimed is:

1. A method for manufacturing a positive active material formed of a lithium-transition metal composite oxide for a nonaqueous electrolyte secondary battery, the method comprising:
    coating a nickel-containing hydroxide with a niobium compound by simultaneously adding a niobium salt solution and an acid to a slurry of a nickel-containing hydroxide, and pH of the slurry is controlled to between 7 and 11 on a 25° C. basis, thereby obtaining a nickel-containing hydroxide coated with a niobium compound;
    mixing the nickel-containing hydroxide coated with the niobium compound with a lithium compound, thereby obtaining a lithium mixture; and firing the lithium mixture at 700 to 830° C. in an oxidizing atmosphere, thereby obtaining the lithium-transition metal composite oxide, wherein the lithium-transition metal composite oxide is represented by a General Formula $Li_dNi_{1-a-b-c}Co_aM_bNb_cO_2$, where M is at least one element selected from Mn, V, Mg, Ti and Al, and a, b, c and d satisfy $0.05 \leq a \leq 0.35$, $0 \leq b \leq 0.10$, $0.006 \leq c \leq 0.06$, and $0.95 \leq d \leq 1.20$, and the positive active material is composed of particles with a polycrystalline structure.

2. The method for manufacturing a positive active material for a nonaqueous electrolyte secondary battery according to claim 1, wherein the step of coating niobium is preceded by a step of adding an alkaline aqueous solution to a mixed aqueous solution containing at least nickel and cobalt to crystallize the solution and obtain the nickel-containing hydroxide, the nickel-containing hydroxide being represented by a General Formula (1) $Ni_{1-a'-b'}Co_{a'}M_{b'}(OH)_2$, where M is at least one element selected from Mn, V, Mg, Ti and Al, and a' and b' satisfy $0.05 \leq a' \leq 0.35$, and $0 \leq b' \leq 0.10$.

3. The method for manufacturing a positive active material for a nonaqueous electrolyte secondary battery according to claim 1, wherein c representing the niobium content of the lithium-transition metal composite oxide satisfies $0.006 \leq c \leq 0.05$.

4. The method for manufacturing a positive active material for a nonaqueous electrolyte secondary battery according to claim 1, wherein the pH of the slurry is controlled at between 7 and 10 on a 25° C. basis in the step of coating niobium.

5. The method for manufacturing a positive active material for a nonaqueous electrolyte secondary battery according to claim 1, wherein the step of mixing is preceded by a step of heat treating the nickel-containing hydroxide coated with the niobium compound at 105° C. to 800° C.

6. The method for manufacturing a positive active material for a nonaqueous electrolyte secondary battery according to claim 1, further comprising a step of water washing the lithium-transition metal composite oxide obtained in the firing step with water in a proportion of 100 to 2000 g/L.

7. A positive active material for a nonaqueous electrolyte secondary battery, manufactured by the method according to claim 1, the positive active material comprising a lithium-transition metal composite oxide which is represented by the General Formula $Li_dNi_{1-a-b-c}Co_aM_bNb_cO_2$, where M is at least one element selected from Mn, V, Mg, Ti and Al, and $0.05 \leq a \leq 0.35$, $0 \leq b \leq 0.10$, $0.006 \leq c \leq 0.06$, and $0.95 \leq d \leq 1.20$ are established and which is composed of particles with a polycrystalline structure, wherein the material has a specific surface area of 2.0 to 7.0 $m^2/g$, and a porous structure with a ratio of (total number of voids in a cross-section of a particle)/(a first longest cross-sectional diameter of the particle) is 2/μm or more, the number of voids being obtained by counting voids, each void having a second longest cross-sectional diameter of 0.3 μm or more between any two points on an outer edge of the void in an observation plane.

8. The positive active material for a nonaqueous electrolyte secondary battery according to claim 7, wherein the crystallite diameter of the lithium-transition metal composite oxide is 10 to 150 nm.

9. The positive active material for a nonaqueous electrolyte secondary battery according to claim 8, wherein c representing the niobium content of the lithium-transition metal composite oxide satisfies $0.006 \leq c \leq 0.05$.

10. A nonaqueous electrolyte secondary battery comprising a positive active material for a nonaqueous electrolyte secondary battery according to claim 7 in the positive electrode.

11. The method for manufacturing a positive active material for a nonaqueous electrolyte secondary battery according to claim 2, wherein c representing the niobium content of the lithium-transition metal composite oxide satisfies $0.006 \leq c \leq 0.05$.

12. A nonaqueous electrolyte secondary battery comprising a positive active material for a nonaqueous electrolyte secondary battery according to claim 8 in the positive electrode.

13. A nonaqueous electrolyte secondary battery comprising a positive active material for a nonaqueous electrolyte secondary battery according to claim 9 in the positive electrode.

* * * * *